United States Patent
Aikyo

(10) Patent No.: US 11,866,112 B2
(45) Date of Patent: Jan. 9, 2024

(54) AIRBAG DEVICE FOR SADDLE-TYPE VEHICLE

(71) Applicant: HONDA MOTOR CO., LTD., Tokyo (JP)

(72) Inventor: Yutaka Aikyo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/910,490

(22) PCT Filed: Mar. 31, 2020

(86) PCT No.: PCT/JP2020/014920
§ 371 (c)(1),
(2) Date: Sep. 9, 2022

(87) PCT Pub. No.: WO2021/199334
PCT Pub. Date: Oct. 7, 2021

(65) Prior Publication Data
US 2023/0128268 A1 Apr. 27, 2023

(51) Int. Cl.
*B62J 27/20* (2020.01)

(52) U.S. Cl.
CPC .................................... *B62J 27/20* (2020.02)

(58) Field of Classification Search
CPC ...................................................... B62J 27/20
See application file for complete search history.

(56) References Cited

U.S. PATENT DOCUMENTS

| | | | | |
|---|---|---|---|---|
| 3,930,667 A * | 1/1976 | Osuchowski | ........... | B60R 21/16 441/103 |
| 4,685,151 A * | 8/1987 | Kincheloe | ................ | B62J 27/20 2/466 |
| 5,938,231 A * | 8/1999 | Yamazaki | ................ | B62J 27/20 280/728.1 |
| 5,967,545 A * | 10/1999 | Iijima | ................... | B60R 21/239 280/739 |
| 2006/0175811 A1* | 8/2006 | Goto | ........................ | B62J 27/20 2/456 |

FOREIGN PATENT DOCUMENTS

| JP | H08-183423 | | 7/1996 |
|---|---|---|---|
| JP | H10-6901 | | 1/1998 |
| JP | 10297403 A | * | 11/1998 |
| JP | 2017-178240 | | 10/2017 |
| WO | WO-2023047544 A1 | * | 3/2023 |

OTHER PUBLICATIONS

English translation of the International Preliminary Report on Patentability dated Oct. 13, 2022 issued in corresponding International application No. PCT/JP2020/014920 (5 pages).
International Search Report, International Application No. PCT/JP2020/014920, dated Jun. 16, 2020, 2 pages.
Written Opinion of the International Searching Authority dated Jun. 16, 2020 filed in PCT/JP2020/014920, 4 pages.

* cited by examiner

*Primary Examiner* — James A English
(74) *Attorney, Agent, or Firm* — Rankin, Hill & Clark LLP

(57) ABSTRACT

In an airbag device of a saddle-type vehicle, the number of component parts to be separated together with an airbag from the saddle-type vehicle can be reduced. In the airbag device for the saddle-type vehicle including an inflator and an airbag to be inflated by gas released by the inflator, after the airbag is inflated and deployed, the airbag is separated from the inflator.

10 Claims, 11 Drawing Sheets

AIRBAG DEVICE FOR SADDLE-TYPE VEHICLE

TECHNICAL FIELD

The present invention relates to an airbag device for a saddle-type vehicle.

BACKGROUND ART

In an airbag device for a saddle-type vehicle, a technique is conventionally known in which the airbag device with an airbag in a deployed state is separated from the saddle-type vehicle (for example, see Patent Literature 1). In Patent Literature 1, the entirety of the airbag device including an airbag, an inflator, an airbag housing, and the like is to be separated from the saddle-type vehicle.

CITATION LIST

Patent Literature

Patent Literature 1: JP H10-6901 A

SUMMARY OF INVENTION

Technical Problem

In the above conventional airbag device of the saddle-type vehicle, however, the entirety of the airbag device is to be separated from the saddle-type vehicle, but it is considered that it is sufficient if at least the airbag is to be separated in order to protect an occupant. Therefore, it is desirable that a small number of component parts is to be separated together with the airbag from the saddle-type vehicle.

The present invention has been made in view of the above-described circumstances, and has an object to reduce the number of component parts to be separated together with an airbag from a saddle-type vehicle, in an airbag device for the saddle-type vehicle.

Solution to Problem

An airbag device for a saddle-type vehicle, the airbag device including an inflator (41), and an airbag (42, 242) to be inflated by gas released by the inflator (41), in which after the airbag (42, 242) is inflated and deployed, the airbag (42, 242) is separated from the inflator (41).

In addition, in the above-described configuration, the airbag (42, 242) may be separated while keeping airtightness of the gas in the airbag (42, 242).

In addition, in the above-described configuration, a separation mechanism (65) that connects the inflator (41) and the airbag (42, 242) to be separable from each other may be further included, in which the separation mechanism (65) may be actuated by pressure of the gas in the airbag (42, 242), and may separate the airbag (42, 242).

Furthermore, in the above-described configuration, the separation mechanism (65) may include a valve (67) that closes an inlet (66) of the gas released by the inflator (41) in the airbag (42, 242), and a lock mechanism portion (68) that locks the airbag (42, 242) in a state of being connected with the inflator (41), and the valve (67) may press the lock mechanism portion (68) with the pressure of the gas in the airbag (42, 242), may release locking of the lock mechanism portion (68), and may close the inlet (66).

In addition, in the above-described configuration, in the separation mechanism (65), an airbag-side connection portion (45a) having a tubular shape of the airbag (42, 242) may fit with a connection portion (43b) having a tubular shape of the inflator (41), the lock mechanism portion (68) may include an engagement member (72) that passes through a hole portion (70) penetrating the connection portion (43b) in a radial direction and that engages with a recess (71) on an inner periphery of the airbag-side connection portion (45a), and a tubular member (73) that is movable in the connection portion (43b) in an axial direction of the connection portion (43b) and that presses the engagement member (72) against the recess (71), and the valve (67) may press the tubular member (73) in an axial direction to move the tubular member (73), and may release pressing of the engagement member (72) against the recess (71).

In addition, in the above-described configuration, when release of the gas from the inflator (41) causes the pressure of the gas in the airbag (42, 242) to be higher than pressure of the gas on the inflator (41) side, the airbag (42, 242) may be separated.

Advantageous Effects of Invention

An airbag device for a saddle-type vehicle, the airbag device including an inflator, and an airbag to be inflated by gas released by the inflator, in which after the airbag is inflated and deployed, the airbag is separated from the inflator.

According to this configuration, after the airbag is inflated and deployed, the airbag is separated from the inflator, and thus the number of component parts to be separated together with the airbag from the saddle-type vehicle can be reduced.

In addition, in the above-described configuration, the airbag may be separated while keeping airtightness of the gas in the airbag.

According to this configuration, also after being separated, the airbag is kept in an inflating state, and thus the occupant can be effectively protected by the airbag.

In addition, in the above-described configuration, a separation mechanism that connects the inflator and the airbag to be separable from each other may be further included, in which the separation mechanism may be actuated by pressure of the gas in the airbag, and may separate the airbag.

According to this configuration, the airbag can be separated by a simple structure using the pressure of the gas in the airbag.

Furthermore, in the above-described configuration, the separation mechanism may include a valve that closes an inlet of the gas released by the inflator in the airbag, and a lock mechanism portion that locks the airbag in a state of being connected with the inflator, and the valve may press the lock mechanism portion with the pressure of the gas in the airbag, may release locking of the lock mechanism portion, and may close the inlet.

According to this configuration, the inlet can be closed by the valve to keep the airtightness of the gas in the airbag, and in addition, the locking by the lock mechanism portion can be released by use of the operation of the valve, so that the airbag can be separated.

In addition, in the above-described configuration, in the separation mechanism, an airbag-side connection portion having a tubular shape of the airbag may fit with a connection portion having a tubular shape of the inflator, the lock mechanism portion may include an engagement member that passes through a hole portion penetrating the connection portion in a radial direction and that engages with a recess on an inner periphery of the airbag-side connection portion, and a tubular member that is movable in the connection portion in an axial direction of the connection portion and that presses the engagement member against the recess, and the valve may press the tubular member in an axial direction to move the tubular member, and may release pressing of the engagement member against the recess.

According to this configuration, the airbag can be separated by a simple structure in which the valve presses the tubular member in the connection portion.

In addition, in the above-described configuration, when release of the gas from the inflator causes the pressure of the gas in the airbag to be higher than pressure of the gas on the inflator side, the airbag may be separated.

According to this configuration, after the airbag is inflated, the airbag can be separated from the inflator.

DESCRIPTION OF EMBODIMENTS

An embodiment of the present invention will be described below with reference to drawings. Note that, in the description, directions such as front, rear, left, right, up, and down are the same as directions with respect to a vehicle body, unless otherwise specified. In addition, in each of the drawings, reference sign FR denotes a front side of a vehicle body, reference sign UP denotes an upper side of the vehicle body, and reference sign LH denotes a left side of the vehicle body.

First Embodiment

Figure 1:
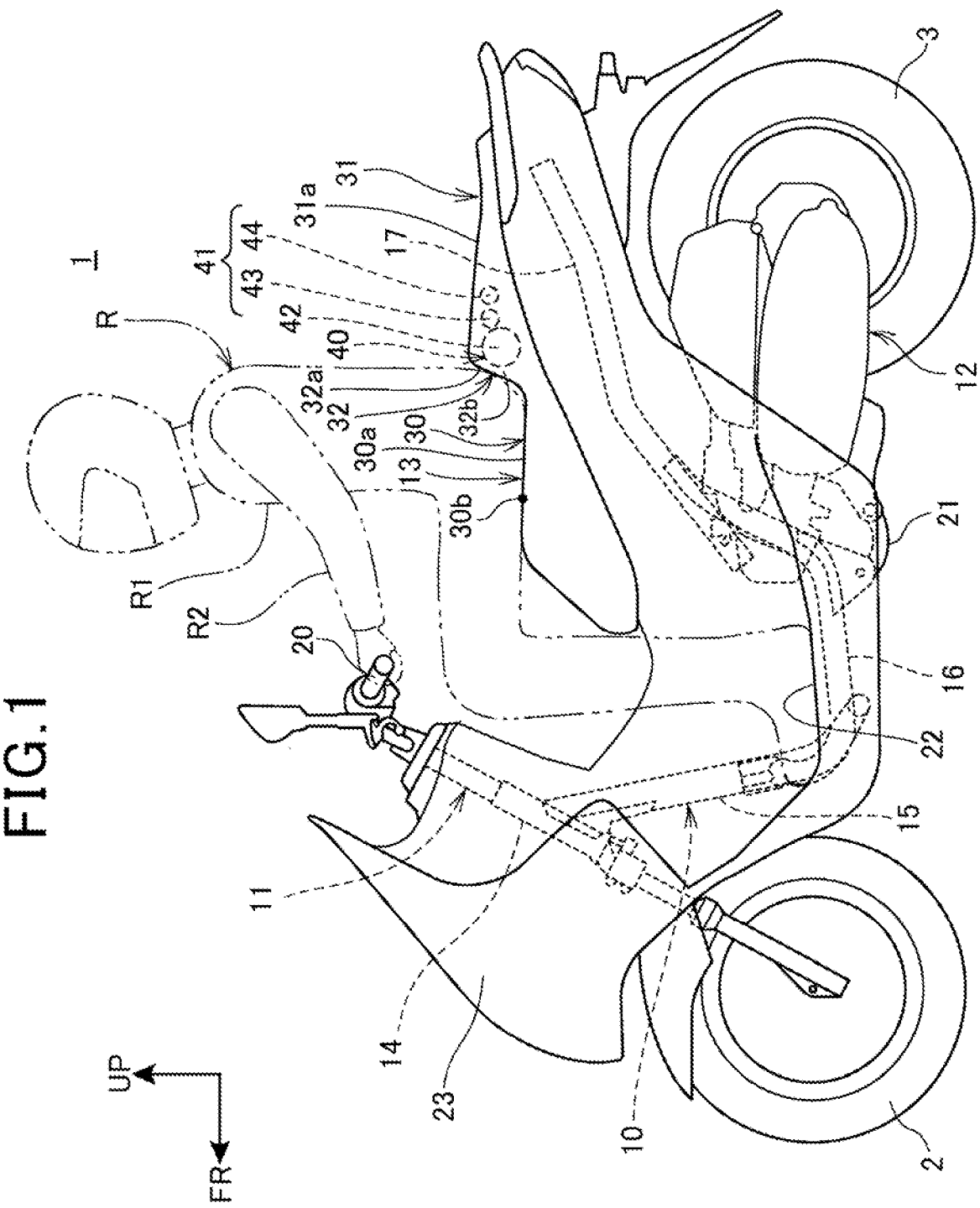
FIG. 1 is a left side view of a motorcycle according to a first embodiment of the present invention.

FIG. 1 is a left side view of a motorcycle 1 according to a first embodiment of the present invention.

The motorcycle 1 is a saddle-type vehicle of scooter type including a vehicle body frame 10, a front fork 11, which steerably supports a front wheel 2, a power unit 12, which is supported by a rear part of the vehicle body frame 10, a rear wheel 3, and a seat 13 on which an occupant R sits astride.

The vehicle body frame 10 includes a head pipe 14 provided at a front end of the vehicle body frame 10, a main frame 15 extending rearward and downward from the head pipe 14, a lower frame 16 extending rearward from a lower end of the main frame 15, and a pair of left and right rear frames 17 extending rearward and upward from the lower frame 16.

The front fork 11 is supported to be steerable to the left and right by the head pipe 14. The front wheel 2 is supported by a lower end portion of the front fork 11. A handlebar 20 gripped by the occupant R is attached to an upper end portion of the front fork 11.

The power unit 12 is a unit swing engine having functions of an engine as a drive source of the rear wheel 3 and a swing arm that supports the rear wheel 3. The power unit 12 is pivotally supported by the vehicle body frame 10 via a link member 21 so as to be vertically swingable.

A step floor 22 on which the occupant R, who is a driver, places its feet is provided on a front lower side of the seat 13.

The motorcycle 1 includes a vehicle body cover 23, which covers a vehicle body such as the vehicle body frame 10.

The seat 13 is provided above the rear frame 17. The seat 13 includes a front seat 30, on which the occupant R is seated, and a rear seat 31, which is disposed on a rear side and an upper side of the front seat 30.

The seat 13 is a seat in which the front seat 30 and the rear seat 31 are integrally provided continuously in a front-and-rear direction.

The rear seat 31 is formed in a step shape to be higher than the front seat 30 on the rear side of the front seat 30.

An upper surface of the front seat 30 is a front-side seating surface 30a, on which the occupant R is seated. The seat 13 includes a step portion 32, which vertically connects a rear end portion of a front-side seating surface 30a and a front end portion of an upper surface 31a of the rear seat 31. The step portion 32 is also a front end portion of the rear seat 31. The step portion 32 is formed between the front seat 30 and the rear seat 31.

A front surface 32a of the step portion 32 is slightly inclined rearward with respect to the vertical direction in a vehicle side view, and is disposed to face a front upper side of the motorcycle 1. The front surface 32a is positioned on an upper side relative to the front seat 30. In addition, left and right side surfaces 32b of the step portion 32 are positioned on an upper side relative to the front seat 30.

The passenger is able to sit on the upper surface 31a of the rear seat 31.

Figure 2:
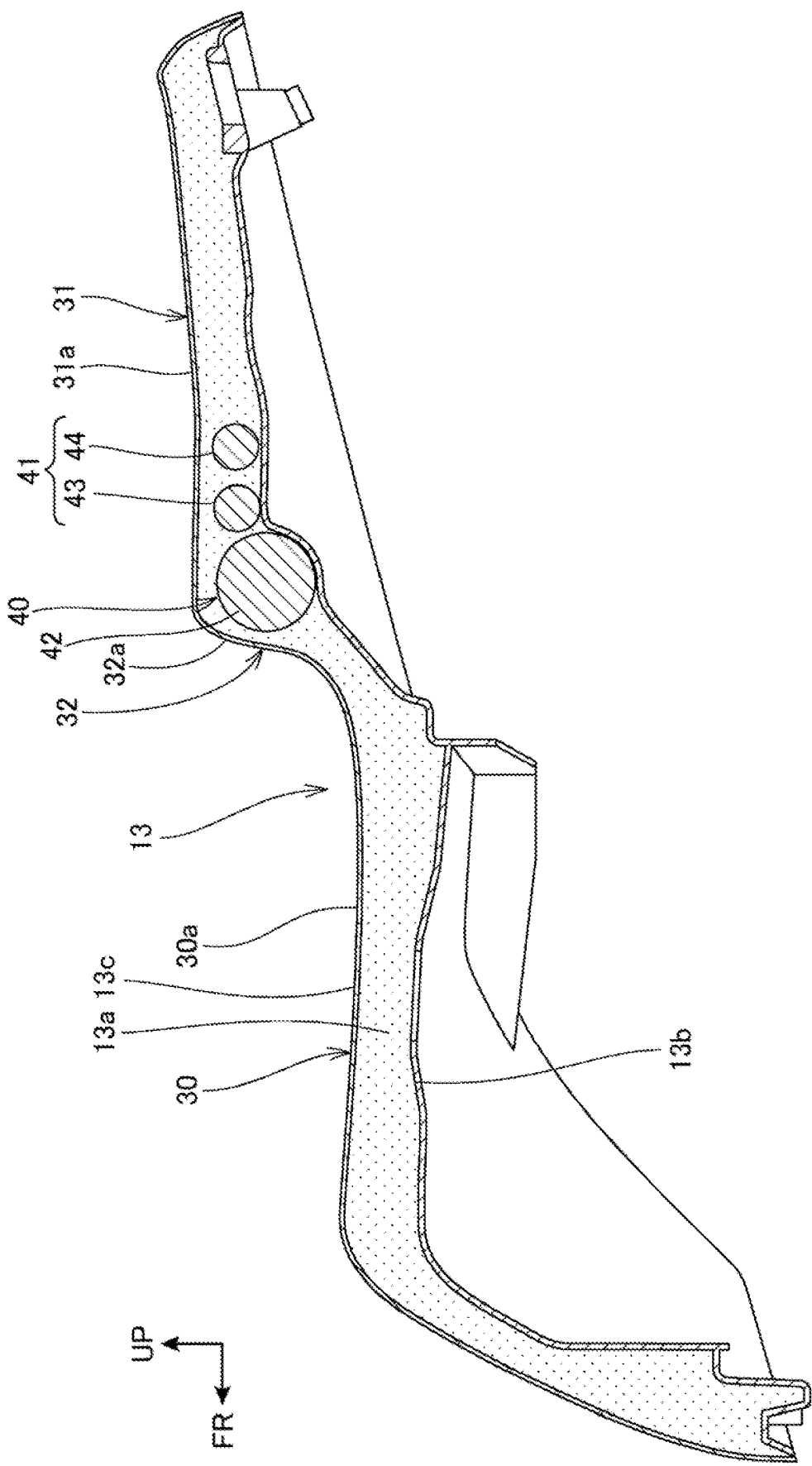
FIG. 2 is a cross-sectional view of a seat.

FIG. 2 is a cross-sectional view of the seat 13.

Referring to FIGS. 1 and 2, the seat 13 includes a cushion 13a, which is constituted of a cushion material such as urethane, a seat bottom plate 13b, which supports the cushion 13a from below, and a seat cover 13c, which covers the cushion 13a from above and lateral sides. The front-side seating surface 30a and the upper surface 31a constitute the surface of the seat cover 13c.

The seat bottom plate 13b corresponds to the shapes of the front seat 30 and the rear seat 31, and a rear part is formed in a step shape higher than a front part.

An airbag device 40 is disposed in the seat 13, on a rear side of the step portion 32. In addition, it can also be said that the airbag device 40 is disposed in a front end part of the rear seat 31.

The airbag device 40 is disposed, on the rear side of the step portion 32, between the seat bottom plate 13b and the seat cover 13c, and is positioned on a rear upper side with respect to the front-side seating surface 30a. Further, the airbag device 40 is positioned below the upper surface 31a of the rear seat 31.

Figure 3:
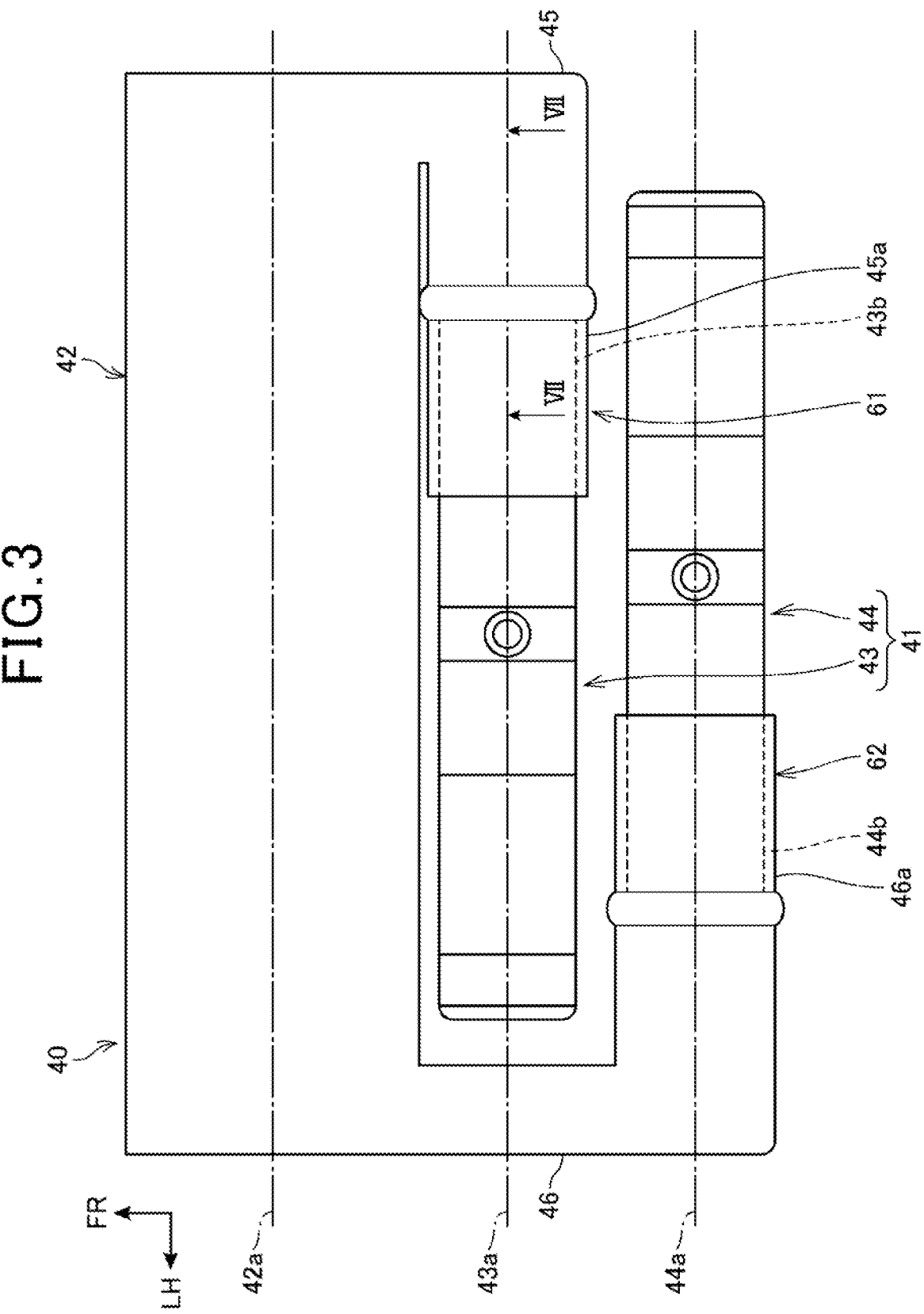
FIG. 3 is a plan view of an airbag device, when viewed from above.

FIG. 3 is a plan view of the airbag device 40, when viewed from above.

Referring to FIGS. 1 to 3, the airbag device 40 includes an inflator 41, and an airbag 42 to be inflated by gas released by the inflator 41.

The inflator 41 includes a first inflator 43 and a second inflator 44.

The first inflator 43 and the second inflator 44 each have a rod shape extending in a vehicle width direction, and are disposed with rod-shaped axial lines 43a and 44a oriented in the vehicle width direction.

The first inflator 43 is disposed on a rear side of the airbag 42 in the rear seat 31. The second inflator 44 is disposed on a rear side of the first inflator 43 in the rear seat 31, and is disposed in substantially parallel with the first inflator 43. The first inflator 43 and the second inflator 44 are fixed to the seat bottom plate 13b.

The first inflator 43 includes a connection portion 43b connected with the airbag 42 at one end in an axial direction.

The second inflator 44 includes a connection portion 44b connected with the airbag 42 at one end in the axial direction.

The first inflator 43 is disposed such that the connection portion 43b is positioned at one end (right end) in the vehicle width direction. The second inflator 44 is disposed such that the connection portion 44b is positioned at the other end (left end) in the vehicle width direction.

The airbag 42 is accommodated in a folded state of a roll shape on the rear side of the step portion 32 in the seat 13. The airbag 42 is disposed such that an axial line 42a having a roll shape is oriented in the vehicle width direction. The airbag 42 is disposed such that the longitudinal direction of the airbag 42 is oriented in the vehicle width direction. The airbag 42 is disposed immediately on a rear side of the front surface 32a of the step portion 32.

The airbag 42 is disposed on a front side of the first inflator 43 in substantially parallel with the first inflator 43. The airbag 42 is disposed on the seat bottom plate 13b.

The airbag 42, in a folded state of a roll shape, includes an extension portion 45 extending rearward from one end portion in the vehicle width direction and connected with the first inflator 43, and an extension portion 46 extending rearward from the other end portion in the vehicle width direction and connected with the second inflator 44.

An airbag-side connection portion 45a connected with the connection portion 43b of the first inflator 43 is provided at an end portion of the extension portion 45.

An airbag-side connection portion 46a connected with the connection portion 44b of the second inflator 44 is provided at an end portion of the extension portion 46.

The gas released by the first inflator 43 flows into the airbag 42 through the extension portion 45. The gas released by the second inflator 44 flows into the airbag 42 through the extension portion 46.

The motorcycle 1 includes an acceleration sensor (not illustrated) for detecting an impact acting on the motorcycle 1. This acceleration sensor is electrically connected with a control unit (not illustrated) of the motorcycle 1, and the control unit is electrically connected with the inflator 41. The control unit determines the actuation or non-actuation of the airbag device 40, based on the detected acceleration. In actuating the airbag device 40, the control unit operates the inflator 41 to release the gas into the airbag 42. The airbag 42 is inflated and deployed by the pressure of the gas.

Figure 4:
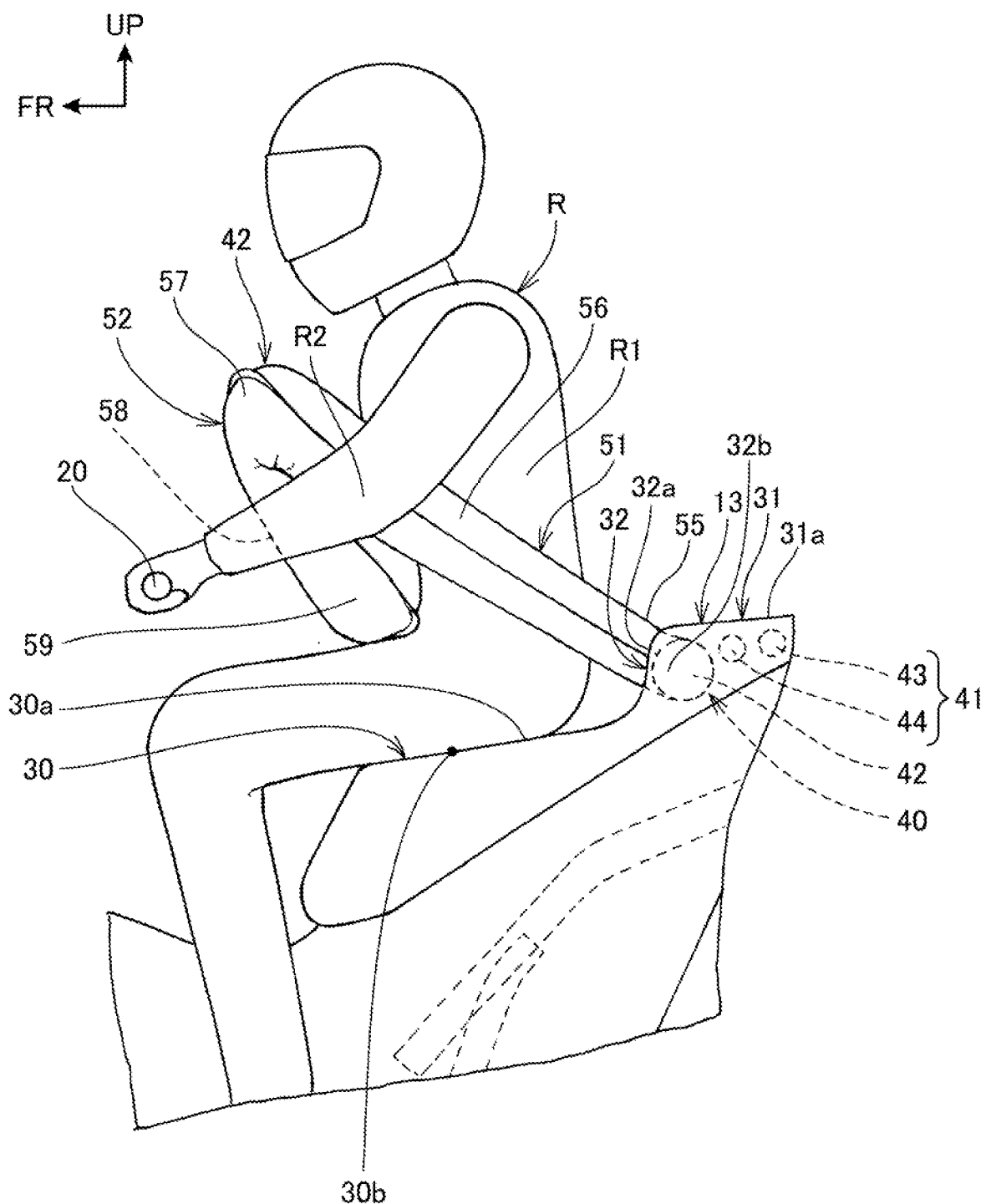
FIG. 4 is a left side view of the motorcycle in which the airbag is in a deployed state.
Figure 5:
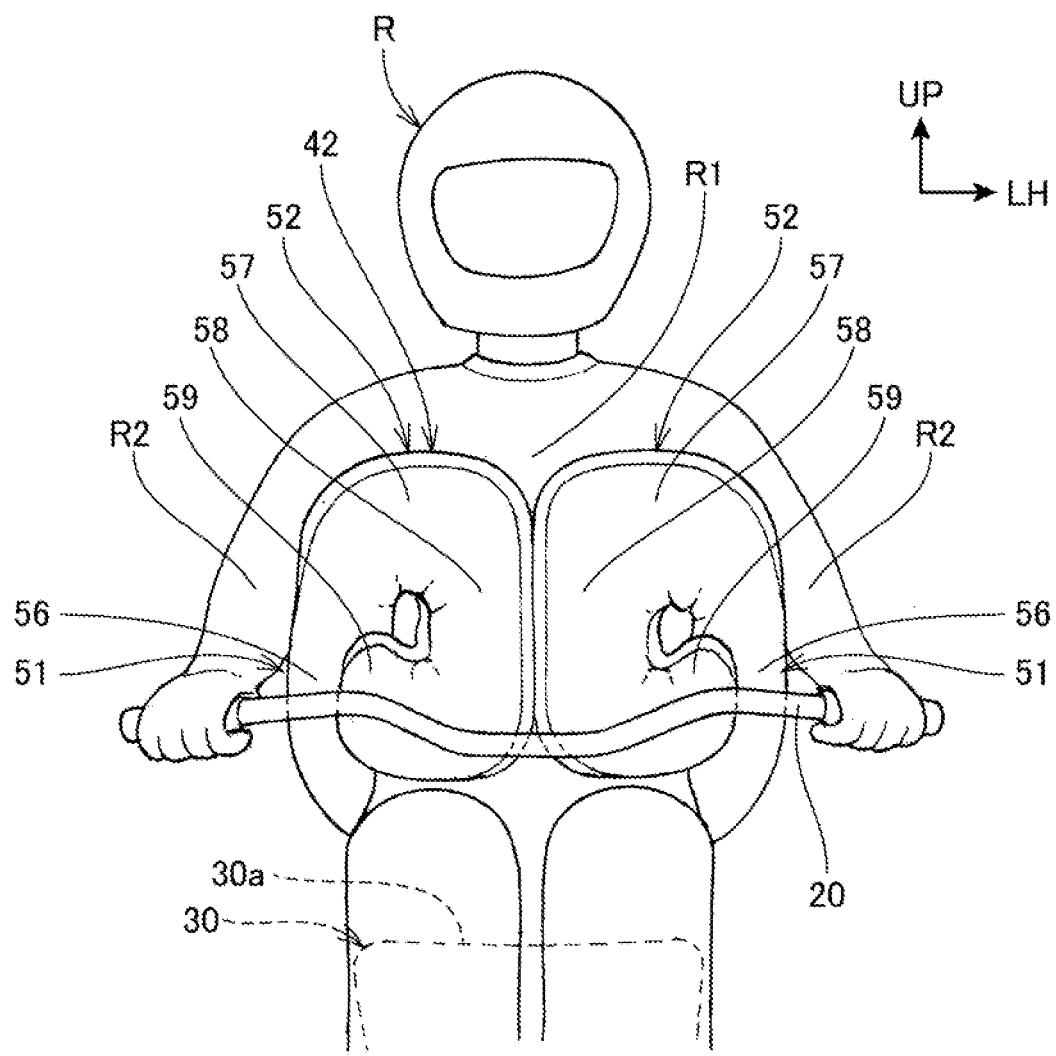
FIG. 5 is a front view of a deployed state of the airbag, when viewed from the front side.
Figure 6:
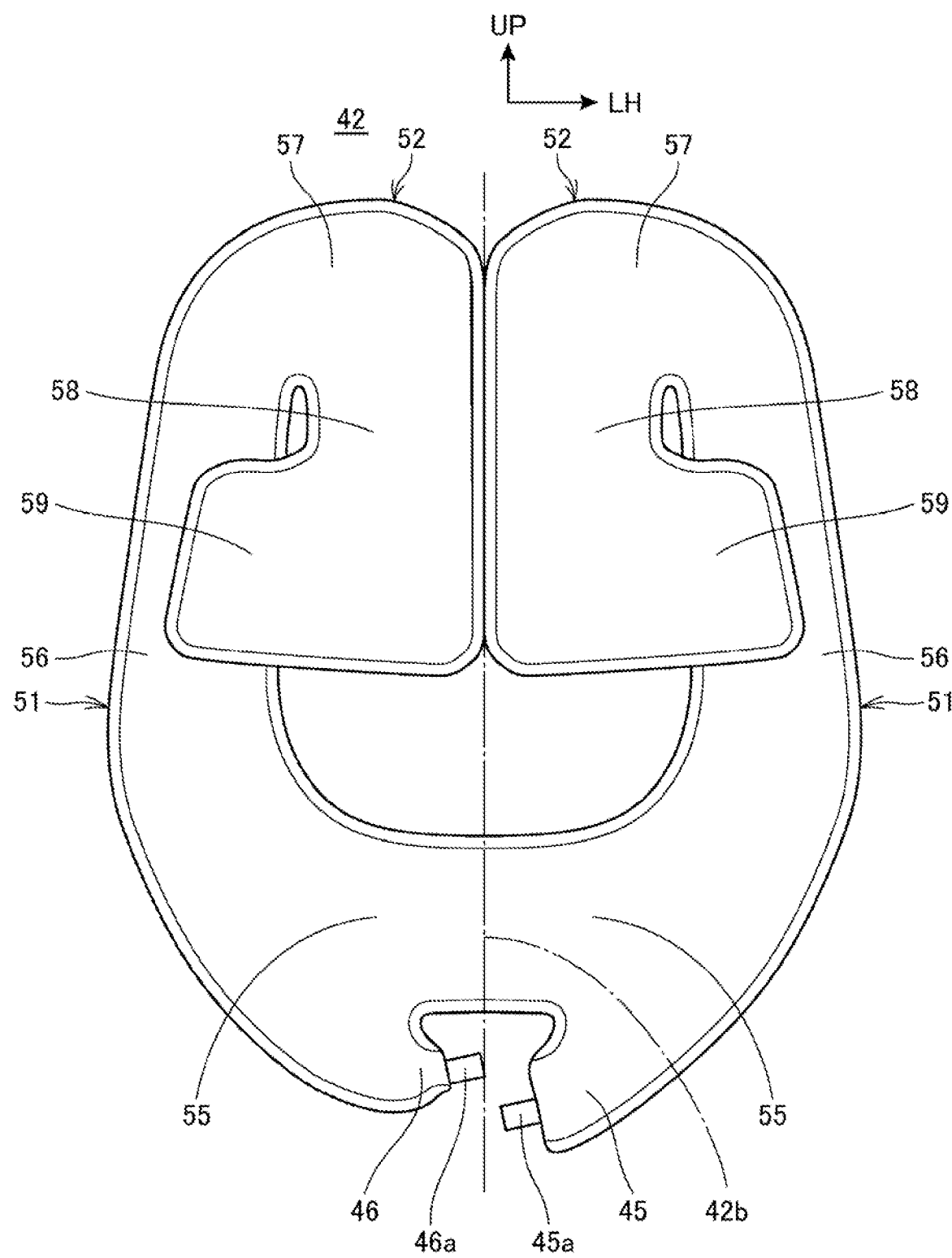
FIG. 6 is a view illustrating the airbag in the deployed state.

FIG. 4 is a left side view of the motorcycle 1 in which the airbag 42 is in a deployed state. FIG. 5 is a front view of the airbag 42 in the deployed state, when viewed from the front side. FIG. 6 is a view illustrating the airbag 42 in the deployed state.

Referring to FIGS. 4 to 6, the airbag 42 is deployed forward and upward from the step portion 32 of the seat 13.

On the front surface 32a of the step portion 32, an opening, through which the inflating airbag 42 passes, is formed in conjunction with the inflation of the airbag 42. This opening is formed, for example, by a fragile portion provided on the front surface 32a of the step portion 32 being cleaved by the inflating airbag 42. The airbag 42 is deployed forward and upward from the front surface 32a of the step portion 32.

Note that it is sufficient if the opening, through which the inflating airbag 42 passes, is formed by the fragile portion provided on at least one of the front surface 32a or the side surfaces 32b of the step portion 32 being cleaved by the inflating airbag 42. The airbag 42 may be deployed forward from both the front surface 32a and the side surfaces 32b.

The airbag 42 includes a forward deployment portion 51 extending forward and upward from the step portion 32, and an inward deployment portion 52 to be deployed inward in the vehicle width direction from a front end portion of the forward deployment portion 51. A pair of left and right forward deployment portions 51 and a pair of left and right inward deployment portions 52 are provided to be substantially left-right symmetric with respect to a center portion 42b (FIG. 6) in a width direction of the airbag 42 (in the vehicle width direction). Note that in the present first embodiment, the inward deployment portion 52 is deployed inward in the vehicle width direction from the front end portion of the forward deployment portion 51. However, it is sufficient if the inward deployment portion 52 is deployed inward in the vehicle width direction from the front portion of the forward deployment portion 51.

The forward deployment portion 51 includes a first deployment portion 55 to be deployed outward in the vehicle width direction from the center portion 42b in the width direction of the airbag 42, and a second deployment portion 56 to be deployed forward and upward of the vehicle from an end portion on an outer side in the vehicle width direction of the first deployment portion 55.

The inward deployment portion 52 includes a third deployment portion 57 to be deployed inward in the vehicle width direction from a front end portion of the second deployment portion 56, a fourth deployment portion 58 to be deployed downward from an end portion on an inner side in the vehicle width direction of the third deployment portion 57, and a fifth deployment portion 59 to be deployed outward in the vehicle width direction from a lower end portion of the fourth deployment portion 58. The fifth deployment portion 59 overlaps the second deployment portion 56 from the front side.

The left and right first deployment portions 55 are connected with each other on the center portion 42b, and thus the left and right forward deployment portions 51 are connected in a left-and-right direction. The left and right forward deployment portions 51 are internally communicated with each other through the first deployment portions 55. Note that the left and right first deployment portions 55 do not have to communicate with each other. For example, a partition portion for partitioning the inside of the left and right first deployment portions 55 into the left and right may be provided, so that the left and right first deployment portions 55 may be independent of each other.

The extension portion 45 is provided at a lower portion of the first deployment portion 55 of one side (right side) of the left and right forward deployment portions 51, and the forward deployment portion 51 on the right side is connected with the connection portion 43b (FIG. 3) of the first inflator 43 through the airbag-side connection portion 45a of the extension portion 45.

The extension portion 46 is provided at a lower portion of the first deployment portion 55 of the other side (left side) of the left and right forward deployment portions 51, and the forward deployment portion 51 on the left side is connected with the connection portion 44b (FIG. 3) of the second inflator 44 through the airbag-side connection portion 46a of the extension portion 46.

When the gas is released from the first inflator 43 and the second inflator 44, the left and right first deployment portions 55 are deployed outward in the vehicle width direction from the step portion 32. Then, the airbag 42 is deployed successively in order from the second deployment portions 56 to the fifth deployment portions 59.

The first deployment portions 55 extend in the vehicle width direction on a rear upper side of the front seat 30, and cover a lower part of a trunk R1 of the occupant R from a rear side.

The left and right second deployment portions 56 are deployed obliquely forward and upward from the step portion 32, in the vehicle side view. The left and right second deployment portions 56 respectively extend forward on the left and right outer sides with respect to the center portion in the vehicle width direction of the front seat 30. The left and right second deployment portions 56 are respectively deployed forward and upward passing between the trunk R1 of the occupant R and arms R2 of the occupant R, who is seated on the front seat 30 gripping the handlebar 20. Specifically, the left and right forward deployment portions 51 are respectively deployed from below the arms R2 of the occupant R gripping the handlebar 20 to above the arms R2 passing through the inner sides in the vehicle width direction of the arms R2.

In addition, the left and right second deployment portions 56 are deployed to a front side relative to an intermediate portion 30b in the front-and-rear direction of the front seat 30, in the vehicle side view. Front end portions of the left and right second deployment portions 56 are positioned directly above a front end portion of the front seat 30.

In addition, the left and right second deployment portions 56 are deployed to positions on a front side relative to the trunk R1 of the occupant R. The left and right second deployment portions 56 cover the trunk R1 of the occupant R from the outside in the vehicle width direction.

The left and right third deployment portions 57 extend in the vehicle width direction on a front side of the trunk R1 of the occupant R, and cover the trunk R1 from the front side.

The left and right fourth deployment portions 58 extend in an up-and-down direction on the front side of the trunk R1, and cover the trunk R1 from the front side. End faces on inner sides in the vehicle width direction of the left and right fourth deployment portions 58 abut each other. Note that here, the fourth deployment portions 58 respectively extend downward from the third deployment portions 57. However, the fourth deployment portions 58 may respectively extend upward from the third deployment portions 57 to protect the occupant from the front side. In addition, the end faces on the inner sides in the vehicle width direction of the left and right fourth deployment portions 58 may be spaced apart from each other in the vehicle width direction.

The left and right fifth deployment portions 59 respectively extend in the vehicle width direction on a lower side relative to the third deployment portions 57 on the front side of the trunk R1, and cover the trunk R1 from the front side.

The airbag device 40 is provided on the rear side of the step portion 32 between the front seat 30 and the rear seat 31. Therefore, the airbag device 40 is less likely to interfere with sitting of the occupant R, and is efficiently disposed by use of a space on the rear side of the step portion 32.

The airbag 42 is deployed forward from the front surface 32a of the step portion 32, and thus the airbag is capable of extending forward efficiently.

Regarding the airbag 42, the forward deployment portions 51 extend forward from the step portion 32, and the inward deployment portions 52 are deployed on the front side of the occupant R. Therefore, even in a structure in which the airbag 42 is disposed on the rear side of the front seat 30, the occupant R can be effectively protected.

The airbag 42 is positioned on the front, rear, left, and right sides of the trunk R1, and surrounds the trunk R1 from its periphery, so that the occupant R can be effectively protected.

The inward deployment portions 52 cover a wide area of the trunk R1 from a front side with the third deployment portions 57, the fourth deployment portions 58, and the fifth deployment portions 59, so that the occupant can be effectively protected.

Figure 7:
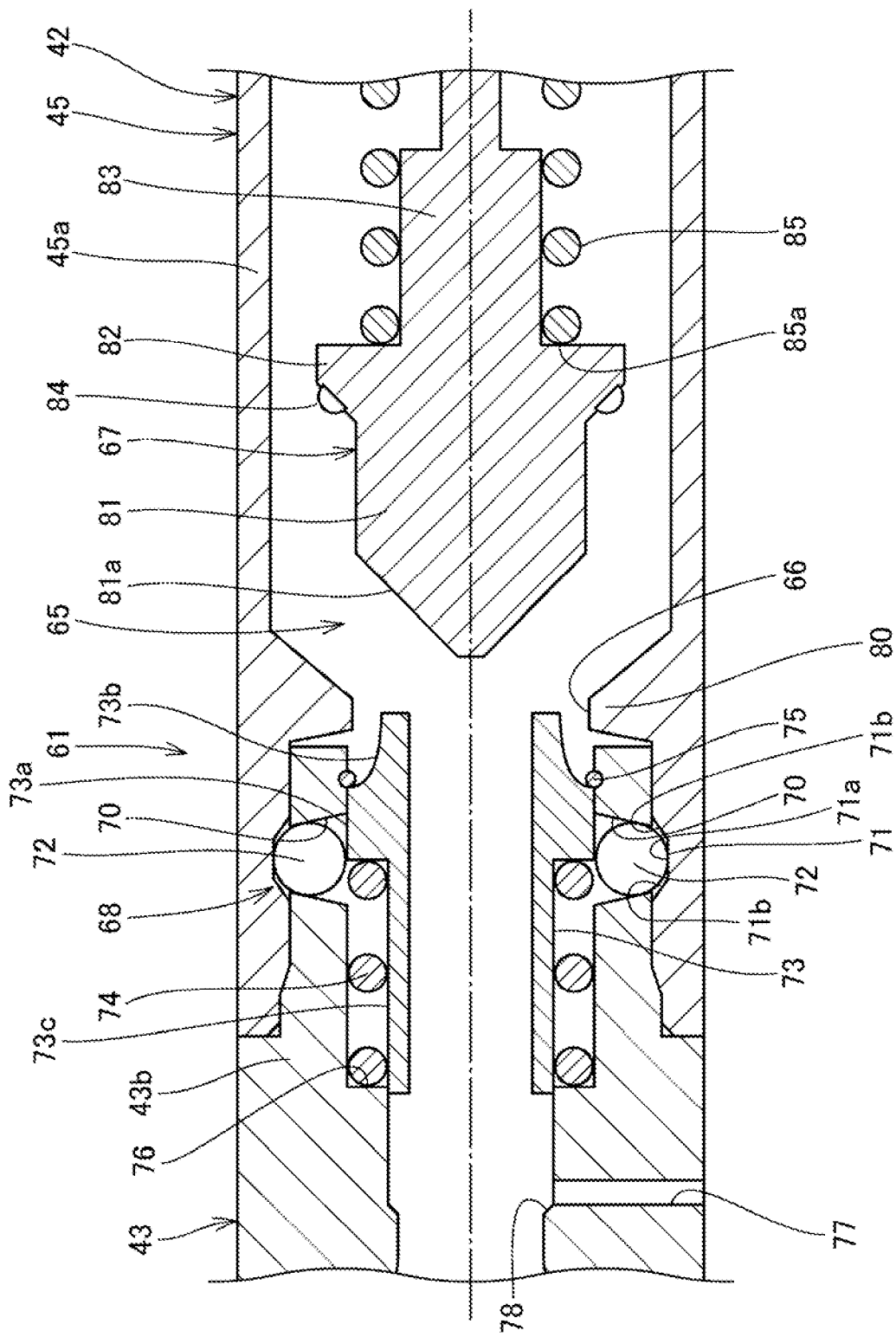
FIG. 7 is a cross-sectional view taken along line VII-VII in FIG. 3, and illustrates a connection structure between a connection portion and an airbag-side connection portion.

FIG. 7 is a cross-sectional view taken along line VII-VII in FIG. 3, and illustrates a connection structure 61 between the connection portion 43b and the airbag-side connection portion 45a.

The connection structure 61 between the connection portion 43b of the first inflator 43 and the airbag-side connection portion 45a, and a connection structure 62 (FIG. 3) between the connection portion 44b of the second inflator 44 and the airbag-side connection portion 46a are similar to each other. Therefore, here, the connection structure 61 between the connection portion 43b and the airbag-side connection portion 45a will be described in detail.

In the connection structure 61, the inner periphery of the airbag-side connection portion 45a having a tubular shape fits into the outer periphery of the connection portion 43b, and thus the connection portion 43b and the airbag-side connection portion 45a are connected with each other.

The connection structure 61 includes a separation mechanism 65 for connecting the connection portion 43b of the first inflator 43 and the airbag-side connection portion 45a of the airbag 42 so as to be separable from each other.

That is, the separation mechanism 65 connects the first inflator 43 and the airbag 42 so as to be separable from each other. In addition, the second inflator 44 and the airbag 42 are connected so as to be separable from each other by a separation mechanism similar to the separation mechanism 65, in the connection structure 62.

The gas in the first inflator 43 flows from the first inflator 43 to the airbag 42. Therefore, the first inflator 43 side will be described as an upstream side of the gas flow, and the airbag 42 side will be described as a downstream side.

The separation mechanism 65 includes a valve 67 for closing an inlet 66 of the gas from the first inflator 43 in the airbag-side connection portion 45a of the airbag 42, and a lock mechanism portion 68 for locking to a state in which the airbag-side connection portion 45a is connected with the connection portion 43b.

The lock mechanism portion 68 includes a hole portion 70, which penetrates the connection portion 43b in a radial direction, a recess 71, which is provided on the inner periphery of the airbag-side connection portion 45a, an engagement member 72, which passes through the hole portion 70 and engages with the recess 71, and a tubular member 73, which has a tubular shape, which fits with the inner periphery of the connection portion 43b, and which is movable in the connection portion 43b in an axial direction of the connection portion 43b.

Further, the lock mechanism portion 68 includes a biasing member 74, which biases the tubular member 73 in the axial direction, and a stopper 75, which restricts the position in the axial direction of the tubular member 73.

A plurality of hole portions 70 are provided in the circumferential direction of the connection portion 43b. The engagement member 72 is a ball disposed in each hole portion 70.

In a cross-sectional view of FIG. 7, the recess 71 is a trapezoidal recess including a bottom surface 71a of the recess 71, and a pair of inclined surface portions 71b connecting an opening surface of the recess 71 and the bottom surface 71a. The space between the pair of inclined surface portions 71b increases, as approaching from the bottom surface 71a toward the opening surface of the recess 71.

The biasing member 74 is a coil spring wound around the outer periphery of the biasing member 74.

The stopper 75 is disposed on a downstream side relative to the hole portion 70 in the axial direction of the connection portion 43b. The stopper 75 is a ring-shaped clip that engages with the inner periphery of the connection portion 43b.

The tubular member 73 includes a pressing portion 73a, which has a tubular shape, and which presses the engagement member 72 outward in the radial direction, an escape portion 73b, which is depressed inward in the radial direction with respect to the outer periphery of the pressing portion 73a, and a biasing member support portion 73c, which has an outer diameter smaller than that of the pressing portion 73a, and around which the biasing member 74 is wound.

The escape portion 73b is provided on a downstream side of the pressing portion 73a in the axial direction of the tubular member 73. The escape portion 73b is a step portion provided on an inner side in the radial direction with respect to the pressing portion 73a, and is opened on the valve 67 side in the axial direction.

The biasing member support portion 73c is provided on an upstream side of the pressing portion 73a in the axial direction of the tubular member 73. The pressing portion 73a is provided between the escape portion 73b and the biasing member support portion 73c in the axial direction of the tubular member 73.

The biasing member 74 is accommodated between the biasing member support portion 73c and the connection portion 43b. The biasing member 74 is compressed between a receiving portion 76 having a step shape and provided on an inner peripheral side of the connection portion 43b and an end face in the axial direction of the pressing portion 73a, and biases the tubular member 73 to move to the valve 67 side (downstream side).

Regarding the tubular member 73, an end face of the pressing portion 73a on the valve 67 side abuts the stopper 75, and thus the position in the axial direction is restricted.

The gas of the inflator 41 flows through the inside of the tube of the tubular member 73 into the airbag-side connection portion 45a.

On an upstream side of the tubular member 73 in the connection portion 43b, an exhaust hole 77, which causes the inside of the tube of the connection portion 43b to communicate with the outside of the connection portion 43b, is provided.

In addition, an abutment portion 78 capable of abutting the tubular member 73 in the axial direction is provided on the inner periphery of the connection portion 43b.

A valve receiving portion 80, which has an annular shape, and which protrudes inward in the radial direction from the inner periphery of the airbag-side connection portion 45a, is provided in the airbag-side connection portion 45a.

The valve receiving portion 80 is disposed on a downstream side relative to the connection portion 43b, in the airbag-side connection portion 45a. The opening defined by the inner periphery of the valve receiving portion 80 serves as the inlet 66 for the gas.

The valve 67 is disposed on a downstream side relative to the valve receiving portion 80, in the airbag-side connection portion 45a.

The valve 67 includes a shaft-shaped portion 81 capable of fitting into the inlet 66 of the valve receiving portion 80, a flange portion 82 having a flange shape extending outward in the redial direction from an end portion on a downstream side in the shaft-shaped portion 81, and a support portion 83 extending on a downstream side from an end face on the downstream side of the shaft-shaped portion 81.

A seal member 84 having an annular shape is provided on a surface of the flange portion 82 facing the valve receiving portion 80.

The valve 67 is biased to move toward the valve receiving portion 80 side (upstream side) by a valve biasing member 85 supported by the support portion 83. The valve biasing member 85 is a coil spring wound around the support portion 83. One end 85a of the valve biasing member 85 is received by an end face of the shaft-shaped portion 81, and the other end of the valve biasing member 85 is received by a receiving portion (not illustrated) provided in the airbag-side connection portion 45a.

A tip end portion of the shaft-shaped portion 81 is a tapered portion 81a, which is tapered toward the upstream side.

Figure 8:
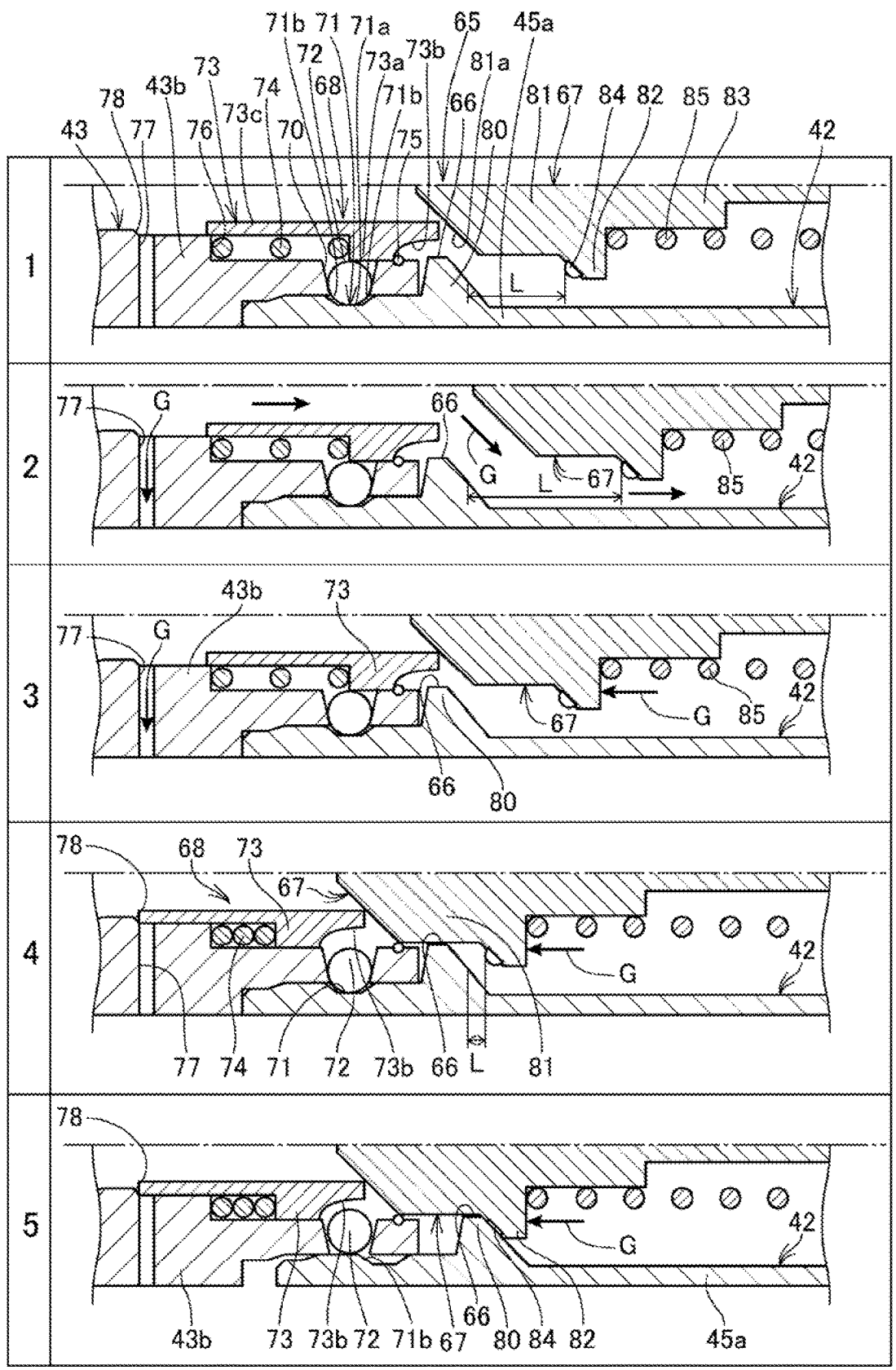
FIG. 8 is a view illustrating an operation state of a separation mechanism by release of gas from an inflator.

Here, with reference to FIG. 8, an operation of separating the airbag 42 by the separation mechanism 65 will be described. FIG. 8 is a diagram illustrating operation states of the separation mechanism 65 due to release of the gas G by the inflator 41. In FIG. 8, the operation states of the separation mechanism 65 are illustrated in time series from a first column on a top stage to a fifth column on a bottom stage.

The first column illustrates a state before the inflator 41 releases the gas G.

The connection portion 43b and the airbag-side connection portion 45a are locked and connected with each other by the lock mechanism portion 68. In detail, the tubular member 73 of the lock mechanism portion 68 is biased by the biasing member 74, and in addition, its position in the axial direction is restricted by the stopper 75, and the pressing portion 73a overlaps the engagement member 72 from the inside. The engagement member 72 in the hole portion 70 is pressed outward in the radial direction of the tubular member 73 by the pressing portion 73a, and engages with the recess 71 of the airbag-side connection portion 45a. Specifically, the engagement member 72 provided in the connection portion 43b prevents the airbag-side connection portion 45a from coming off, and thus the lock mechanism portion 68 locks the connection portion 43b and the airbag-side connection portion 45a in a connected state.

In the state of the first column, the valve 67 is biased toward the tubular member 73 side by the valve biasing member 85. Here, the valve 67 may abut the tubular member 73, or may be spaced apart on a downstream side with respect to the tubular member 73.

In the state of the first column, a gap L is provided between the flange portion 82 of the valve 67 and the valve receiving portion 80, and the inlet 66 is in an open state.

The second column illustrates a state in which the inflator 41 is releasing the gas G.

Referring to the second column, the gas G pushes the valve 67 against the biasing force of the valve biasing member 85, and moves the valve 67 to the downstream side. Accordingly, the gap L becomes larger than the state in the first column. The gas G flows to the downstream side of the valve 67 through the inlet 66, and inflates the airbag 42. Accordingly, as illustrated in FIG. 4, the airbag 42 is deployed forward and upward, and surrounds the occupant R from its periphery.

In addition, the gas G passing through the connection portion 43b is partially discharged from the exhaust hole 77 to the outside of the inflator 41.

The third column illustrates a state in which the release of the gas G by the inflator 41 has ended.

Referring to the third column, when the release of the gas G by the inflator 41 ends and the deployment of the airbag 42 finishes, the restoring force of the valve biasing member 85 moves the valve 67 toward the valve receiving portion 80 side so as to close the inlet 66.

In addition, referring to the third column, when the release of the gas G by the inflator 41 finishes, the pressure in the airbag 42 becomes higher than the pressure in the connection portion 43b on the upstream side of the valve 67, and a pressure difference is generated between the inside of the airbag 42 and the inside of the connection portion 43b. This pressure difference pushes the valve 67 toward the tubular member 73 side on the upstream side, and moves the valve 67 to close the inlet 66.

Referring to the second and third columns, the gas G passing through the connection portion 43b is partially discharged from the exhaust hole 77 to the outside, and thus the pressure in the connection portion 43b can be promptly reduced. Accordingly, the pressure difference between the inside of the airbag 42 and the inside of the connection portion 43b can be increased, and the pressure difference enables strongly pushing the valve 67 toward the tubular member 73 side (upstream side).

The fourth column illustrates a state in which the valve 67 has moved the tubular member 73.

Referring to the fourth column, the valve 67 is pressed by the pressure of the gas in the airbag 42, abuts an end portion on the downstream side of the tubular member 73, and moves the tubular member 73 to the upstream side against the biasing force of the biasing member 74. Accordingly, in the tubular member 73, the escape portion 73b overlaps the engagement member 72 from an inner side in the radial direction. In this state, the tubular member 73 releases the press of the engagement member 72 against the recess 71, and the engagement member 72 is enabled to move to the escape portion 73b side. That is, in the state of the fourth column, locking by the lock mechanism portion 68 is released.

In addition, in the state of fourth column, an end portion on the upstream side of the tubular member 73 abuts the abutment portion 78 of the connection portion 43b, and the position in the axial direction is restricted. Furthermore, the exhaust hole 77 is closed by the tubular member 73, which is abutted by the abutment portion 78. The shaft-shaped portion 81 of the valve 67 fits into the inlet 66.

In the state of the fourth column, the gap L is smaller than that in the state of the first column, but is present.

The fifth column illustrates a state in which the airbag-side connection portion 45a is separated from the connection portion 43b.

In the state of the fifth column, the valve 67 presses the connection portion 43b toward the upstream side through the tubular member 73 and the abutment portion 78. Accordingly, the airbag-side connection portion 45a moves in the axial direction, in a direction separated from the connection portion 43b. In this situation, the engagement member 72 moves into the escape portion 73b, while being pushed by the inclined surface portion 71b of the recess 71.

Further, regarding the valve 67, the flange portion 82 is in close contact with the valve receiving portion 80, and closes the inlet 66. The seal member 84 is sandwiched between the flange portion 82 and the valve receiving portion 80, and seals between the flange portion 82 and the valve receiving portion 80. In the state of the fifth column, the gap L becomes 0.

Then, the airbag-side connection portion 45a is completely separated from the connection portion 43b by the momentum of the pressing of the valve 67, and the airbag 42 is in a state of being separated from the inflator 41. Specifically, the separation mechanism 65 is actuated by the pressure of the gas in the airbag 42.

When the occupant R is separated from the motorcycle 1 by the impact acting on the motorcycle 1, the airbag 42, which has been separated from the inflator 41, is detached from the motorcycle 1 together with the occupant R in a state of surrounding the occupant R as illustrated in FIG. 4. Therefore, the occupant R can be effectively protected by the airbag 42.

In addition, regarding the airbag 42, which has been separated from the inflator 41, the inlet 66 is closed by the valve 67, and the gas in the airbag 42 is kept airtight. Therefore, an inflated state can be kept in the airbag 42, even in a state of being separated from the inflator 41, so that the occupant R can be effectively protected.

Further, the airbag 42 is separated from the inflator 41, and is independently attached to the occupant R, and thus the weight of the airbag device 40 attached to the occupant R in the separated state can be reduced. In addition, it is possible to prevent the inflator 41 from interfering with the protection of the occupant R, in a state where the airbag 42 is separated.

As described heretofore, according to the first embodiment to which the present invention is applied, the motorcycle 1 includes the airbag device 40 in the seat 13 for the occupant R. The seat 13 includes the front seat 30 and the rear seat 31 disposed on a rear side and an upper side of the front seat 30, the step portion 32 is formed between the front seat 30 and the rear seat 31, the airbag device 40 is disposed on a rear side of the step portion 32 in the seat 13, and the airbag 42 of the airbag device 40 is to be deployed forward of the vehicle.

According to this configuration, the airbag device 40 can be efficiently disposed by use of the step portion 32 formed between the front seat 30 and the rear seat 31. In addition, the airbag 42 is to be deployed forward of the vehicle, and thus the occupant R on the front side of the airbag device 40 can be protected by the airbag 42.

Further, the step portion 32 is positioned on an upper side relative to the front seat 30, and the airbag 42 is to be deployed forward of the vehicle from the front surface 32a of the step portion 32.

According to this configuration, the airbag 42 can be efficiently deployed forward of the vehicle from the front surface 32a of the step portion 32. Note that the airbag 42 is deployed from at least one of the front surface 32a or the side surfaces 32b of the step portion 32, so that the airbag 42 can be efficiently deployed forward of the vehicle.

In addition, the airbag 42 is deployed to a front side relative to the intermediate portion 30b in the front-and-rear direction of the front seat 30.

According to this configuration, the occupant R on the front seat 30 can be effectively protected by the airbag 42.

The airbag 42 further includes the forward deployment portion 51 to be deployed forward of the vehicle from the step portion 32, and the inward deployment portion 52 to be deployed inward in the vehicle width direction from the front portion of the forward deployment portion 51.

According to this configuration, the inward deployment portion 52 is deployed inward in the vehicle width direction from the front portion of the forward deployment portion 51, and thus the occupant R is easily protected from the front side by the inward deployment portion 52.

In addition, the forward deployment portion 51 includes the first deployment portion 55 to be deployed outward in the vehicle width direction from the step portion 32, and the second deployment portion 56 to be deployed forward of the vehicle from the first deployment portion 55. The inward deployment portion 52 includes the third deployment portion 57 to be deployed inward in the vehicle width direction from the front end portion of the second deployment portion 56, and the fourth deployment portion 58 to be deployed in the up-and-down direction from the third deployment portion 57.

According to this configuration, the occupant R on the front seat 30 can be surrounded from its periphery by the first deployment portion 55, the second deployment portion 56, the third deployment portion 57, and the fourth deployment portion 58, so that the occupant R can be effectively protected.

In addition, the forward deployment portion 51 is deployed obliquely forward and upward from the step portion 32, in a vehicle side view.

According to this configuration, the occupant R on a front upper side with respect to the step portion 32 can be effectively protected.

Further, the pair of left and right forward deployment portions 51 and the pair of left and right inward deployment portions 52 may be provided, and the left and right forward deployment portions 51 may respectively extend forward on the left and right outer sides with respect to the center portion in the vehicle width direction of the front seat 30.

According to this configuration, the occupant R on the front seat 30 can be surrounded in a wide range by the left and right forward deployment portions 51 and the left and right inward deployment portions 52, so that the occupant R can be effectively protected.

Furthermore, the forward deployment portion 51 is deployed from below the arm R2 of the occupant R seated on the front seat 30 and gripping the handlebar 20 to above the arm R2 through an inner side in the vehicle width direction of the arm R2, and the inward deployment portion 52 covers the trunk R1 of the occupant R from the front side.

According to this configuration, the forward deployment portion 51 enables positioning of the inward deployment portion 52 on a front side of the trunk R1 of the occupant R, the inward deployment portion 52 enables protection of the occupant R from the front side, and the forward deployment portion 51 enables protection of the trunk R1 of the occupant R from lateral sides.

In addition, according to the first embodiment to which the present invention is applied, the airbag device 40 of the motorcycle 1 includes the inflator 41 and the airbag 42 to be inflated by the gas released by the inflator 41. After the airbag 42 is inflated and deployed, the airbag 42 is separated from the inflator 41.

According to this configuration, after the airbag 42 is inflated and deployed, the airbag 42 is separated from the inflator 41. Therefore, the number of component parts separated from the motorcycle 1 together with the airbag 42 can be reduced.

Further, the airbag 42 is separated while keeping airtightness of the gas in the airbag 42.

According to this configuration, also after being separated, the airbag 42 is kept in an inflating state, and thus the occupant can be effectively protected by the airbag 42.

In addition, the separation mechanism 65, which connects the inflator 41 and the airbag 42 to be separable from each other, is provided, and the separation mechanism 65 is actuated by the pressure of the gas in the airbag 42, and separates the airbag 42.

According to this configuration, the airbag 42 can be separated by a simple structure using the pressure of the gas in the airbag 42.

Furthermore, the separation mechanism 65 includes the valve 67, which closes the inlet 66 of the gas released by the inflator 41 in the airbag 42, and the lock mechanism portion 68, which locks the airbag 42 in a state of being connected with the inflator 41. The valve 67 presses the lock mechanism portion 68 with the pressure of the gas in the airbag 42, releases the locking by the lock mechanism portion 68, and closes the inlet 66.

According to this configuration, the inlet 66 can be closed by the valve 67 to keep the airtightness of the gas in the airbag 42, and in addition, the locking by the lock mechanism portion 68 can be released by use of the operation of the valve 67, so that the airbag 42 can be separated.

In addition, in the separation mechanism 65, the airbag-side connection portion 45a having a tubular shape of the airbag 42 fits with the connection portion 43b having a tubular shape of the inflator 41. The lock mechanism portion 68 includes the engagement member 72, which passes through the hole portion 70 penetrating the connection portion 43b in the radial direction, and which engages with the recess 71 on the inner periphery of the airbag-side connection portion 45a, and the tubular member 73, which has a tubular shape, which is movable in the connection portion 43b in the axial direction of the connection portion 43b, and which presses the engagement member 72 against the recess 71. The valve 67 presses the tubular member 73 in the axial direction to move the tubular member 73, and releases pressing of the engagement member 72 against the recess 71.

According to this configuration, the airbag 42 can be separated by a simple structure in which the valve 67 presses the tubular member 73 in the connection portion 43b.

In addition, when the release of the gas of the inflator 41 causes the pressure of the gas in the airbag 42 to be higher than the pressure of the gas on the inflator 41 side, the airbag 42 is separated.

According to this configuration, after the airbag 42 is inflated, the airbag 42 can be separated from the inflator 41.

Note that the above first embodiment illustrates one aspect to which the present invention is applied, and the present invention is not limited to the above first embodiment.

In the above first embodiment, the description has been given for the seat 13, in which the front seat 30 and the rear seat 31 are integrally provided continuously in the front-and-rear direction. However, the present invention is not limited to this. For example, the rear seat 31 may be provided separately from the front seat 30, and the airbag device 40 may be provided on a rear side of the step portion 32 on the rear seat 31 side.

Furthermore, a backrest on which the occupant R is able to place its back may be provided to project upward in an upper portion of the front part of the rear seat 31. Then, the airbag device 40 may be provided, in the seat 13, on a rear side of the step portion formed between the front seat 30 and the rear seat 31 by the backrest.

In addition, in the above first embodiment, the connection portion 43b of the first inflator 43 is formed integrally with the first inflator 43. However, the present invention is not limited to this. For example, the connection portion 43b may be formed by connecting the connection portion 43b, which is provided as a separate component part, with the main body portion of the first inflator 43 by caulking or with a screw. The same also applies to the connection portion 44b of the second inflator 44.

Further, in the above first embodiment, the motorcycle 1 has been described as an example of the saddle-type vehicle. However, the present invention is not limited to this. The present invention is applicable to a three-wheeled saddle-type vehicle including two front wheels or two rear wheels and a saddle-type vehicle including four or more wheels.

Second Embodiment

Hereinafter, a second embodiment to which the present invention is applied will be described with reference to FIGS. 9 and 10. In the present second embodiment, parts having the same configurations as those in the above first embodiment are denoted by the same reference numerals, and their descriptions will be omitted.

In the present second embodiment, the shape of an airbag 242 is different from the airbag 42 in the above first embodiment.

Figure 9:
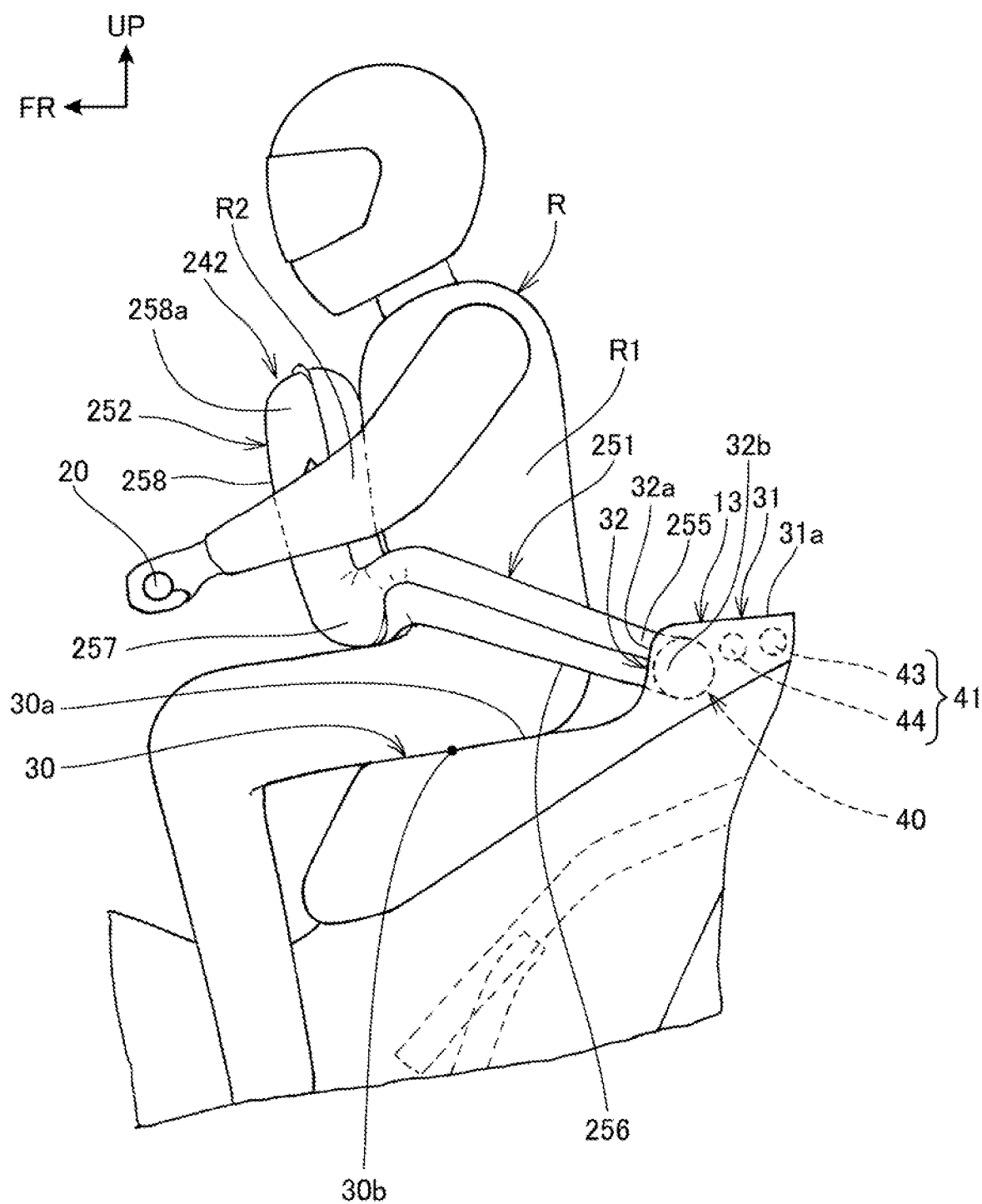
FIG. 9 is a left side view of the motorcycle in which the airbag is in the deployed state, in a second embodiment.
Figure 10:
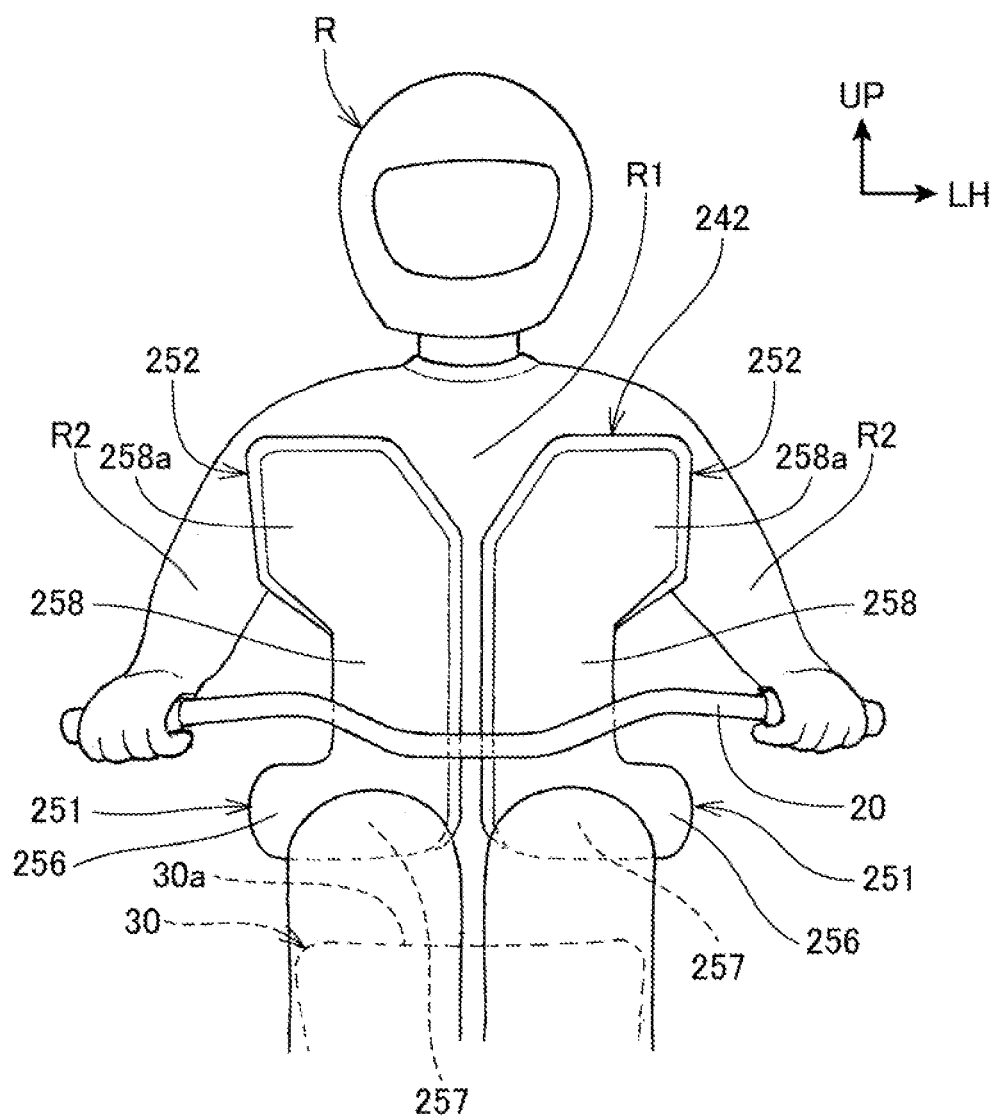
FIG. 10 is a front view of the airbag in the deployed state, when viewed from the front side.

FIG. 9 is a left side view of the motorcycle 1 in which the airbag 242 is in the deployed state, in the second embodiment. FIG. 10 is a front view of the airbag 242 in the deployed state, when viewed from the front side.

The airbag 242 includes a forward deployment portion 251 extending forward from the step portion 32, and an inward deployment portion 252 extending inward in the vehicle width direction from a front end portion of the forward deployment portion 251. The airbag 242 is deployed forward of the vehicle from at least one of the front surface 32a or the side surfaces 32b of the step portion 32.

A pair of the left and right forward deployment portions 251 and a pair of the left and right inward deployment portions 252 are provided to be substantially left-right symmetric with respect to a center portion 42b (FIG. 6) in a width direction of the airbag 242 (in the vehicle width direction).

The forward deployment portion 251 includes a first deployment portion 255 to be deployed outward in the vehicle width direction from the center portion 42b in the width direction of the airbag 242, and a second deployment portion 256 to be deployed forward of the vehicle substantially horizontally from an end portion on an outer side in the vehicle width direction of the first deployment portion 255. The first deployment portion 255 is identical to the first deployment portion 55 in the above first embodiment, but here is denoted by another reference sign for distinction.

The inward deployment portion 252 includes a third deployment portion 257 to be deployed inward in the vehicle width direction from a front end portion of the second deployment portion 256, and a fourth deployment portion 258 to be deployed upward from an end portion on an inner side in the vehicle width direction of the third deployment portion 257. In detail, the fourth deployment portion 258 extends substantially directly upward from the third deployment portion 257 in a front view, and an upper end portion 258a of the fourth deployment portion 258 extends obliquely outward and upward in the vehicle width direction.

The left and right first deployment portions 255 are connected with each other at the center portion 42b (FIG. 6), and thus the left and right forward deployment portions 251 are connected in the left-and-right direction. The left and right forward deployment portions 251 are internally communicated with each other through the first deployment portions 255. Note that the left and right first deployment portions 255 do not have to communicate with each other. For example, a partition for partitioning the inside of the left and right first deployment portions 255 into the left and right may be provided, so that the left and right first deployment portions 255 may be independent of each other.

When the gas is released from the first inflator 43 and the second inflator 44, the left and right first deployment portions 255 are deployed outward in the vehicle width direction from the step portion 32. Then, the airbag 242 is deployed successively in order from the second deployment portion 256 to the fourth deployment portion 258.

The first deployment portion 255 extends in the vehicle width direction on a rear upper side of the front seat 30, and covers a lower part of the trunk R1 of the occupant R from a rear side.

The left and right second deployment portions 256 are deployed forward of the vehicle substantially horizontally in a posture slightly upward on the front side from the step portion 32, in the vehicle side view. The left and right second deployment portions 256 respectively extend forward on the left and right outer sides with respect to the center portion in the vehicle width direction of the front seat 30. In addition, the left and right second deployment portions 256 are deployed to a front side relative to the intermediate portion 30b in the front-and-rear direction of the front seat 30, in the vehicle side view. Front end portions of the left and right second deployment portions 256 are positioned directly above a front end portion of the front seat 30.

In addition, the left and right second deployment portions 256 are deployed to positions on a front side relative to the trunk R1 of the occupant R. The left and right second deployment portions 256 cover a lower part of the trunk R1 of the occupant R from the outside in the vehicle width direction.

The left and right third deployment portions 257 are respectively deployed inward in the vehicle width direction from front end portions of the second deployment portions 256.

The left and right fourth deployment portions 258 extend from below the arm R2 of the occupant R seated on the front seat 30 and gripping the handlebar 20 to above the arm R2 through the inner side in the vehicle width direction of the arm R2. The left and right fourth deployment portions 258 cover the trunk R1 of the occupant R from the front side.

End faces on an inner side in the vehicle width direction of the left and right fourth deployment portions 258 are spaced apart from each other in the vehicle width direction. Note that the end faces on an inner side in the vehicle width direction of the left and right fourth deployment portions 258 may abut each other.

After being deployed, the airbag 242 is separated by the separation mechanism 65 (FIG. 7).

According to the second embodiment, the forward deployment portion 251 includes the first deployment portion 255 to be deployed outward in the vehicle width direction from the step portion 32, and the second deployment portion 256 to be deployed forward of the vehicle substantially horizontally from the first deployment portion 255. The inward deployment portion 252 includes the third deployment portion 257 to be deployed inward in the vehicle width direction from the second deployment portion 256, and the fourth deployment portion 258 to be deployed upward from the third deployment portion 257.

According to this configuration, the occupant R on the front seat 30 can be surrounded from its periphery by the first deployment portion 255, the second deployment portion 256, the third deployment portion 257, and the fourth deployment portion 258, so that the occupant R can be effectively protected.

In addition, the forward deployment portion 251 is deployed forward from the step portion 32 to below the arm R2 of the occupant R seated on the front seat 30 and gripping the handlebar 20, and the inward deployment portion 252 extends upward through the inner side in the vehicle width direction of the arm R2 to cover the trunk R1 of the occupant R from the front side.

According to this configuration, the inward deployment portion 252 can be positioned on the front side of the trunk R1 of the occupant R by the forward deployment portion 251, and the occupant R can be protected from the front side by the inward deployment portion 252. In addition, the occupant R can be protected from the lateral sides by the forward deployment portion 251.

Third Embodiment

Hereinafter, a third embodiment to which the present invention is applied will be described with reference to FIG. 11.

In the present third embodiment, a motorcycle 301 different from the motorcycle 1 in the above first embodiment will be described. In the present third embodiment, parts having the same configurations as those in the above first embodiment are denoted by the same reference numerals, and their descriptions will be omitted.

Figure 11:
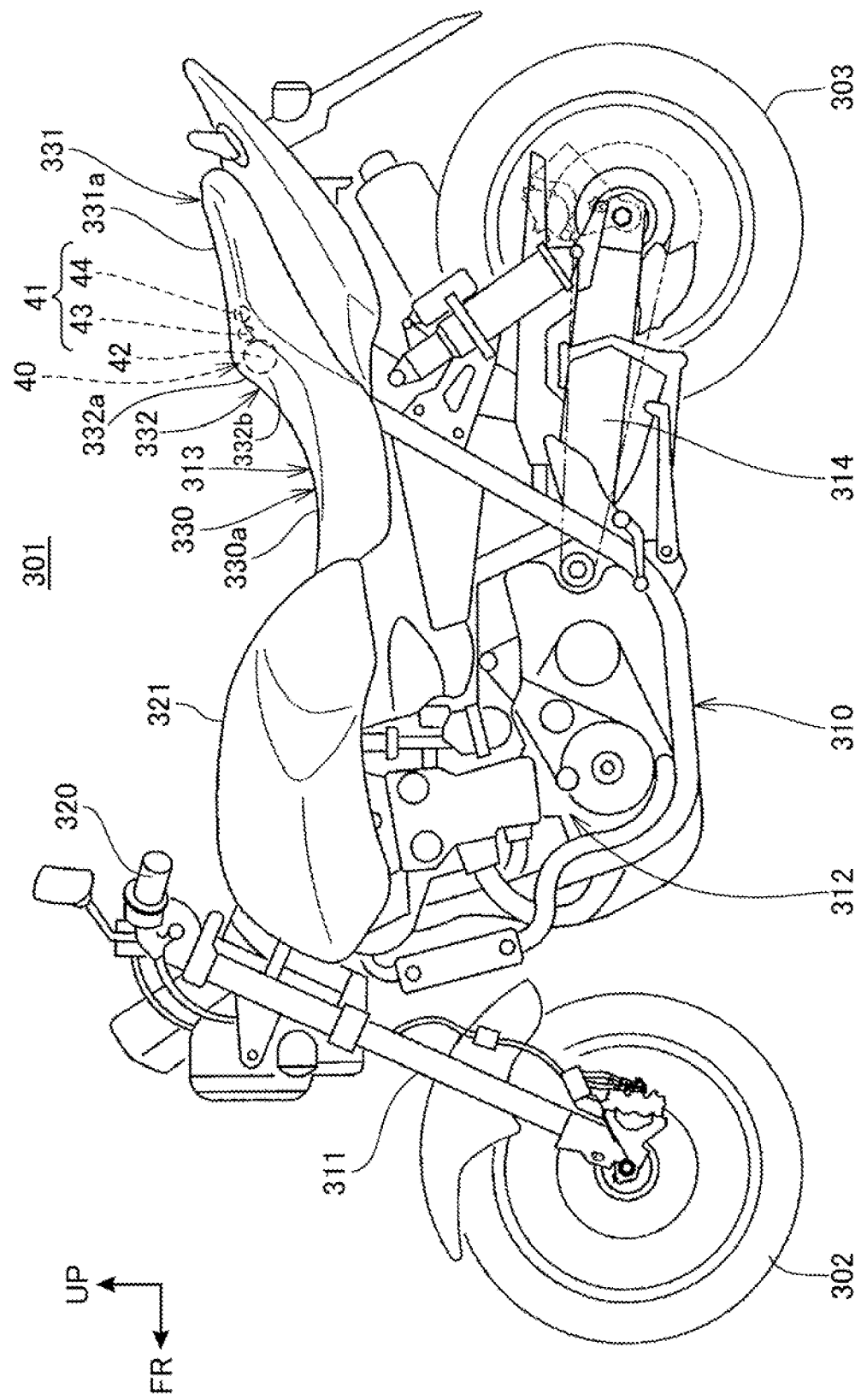
FIG. 11 is a left side view of the motorcycle in a third embodiment.

FIG. 11 is a left side view of the motorcycle 301, in the third embodiment.

The motorcycle 301 is a vehicle in which an engine 312 as a power unit is supported on a vehicle body frame 310, a front fork 311, which steerably supports a front wheel 302 is supported steerably at a front end of the vehicle body frame 310, and a swing arm 314, which supports a rear wheel 303 is provided on a rear part side of the vehicle body frame 310.

The motorcycle 301 is a saddle-type vehicle in which an occupant sits astride on a seat 313, and the seat 313 is provided above a rear part of the vehicle body frame 310.

The handlebar 320 is provided at an upper end of the front fork 311.

A fuel tank 321 is supported on an upper portion of a front part of the vehicle body frame 310, and is disposed between the front fork 311 and the seat 313.

The engine 312 is disposed below the fuel tank 321 on a front side of the swing arm 314.

The seat 313 includes a front seat 330, on which an occupant who is a driver is seated, and a rear seat 331, which is disposed on a rear side and an upper side of the front seat 330.

The seat 313 is a seat in which the front seat 330 and the rear seat 331 are integrally provided continuously in the front-and-rear direction.

The rear seat 331 is formed in a step shape to be higher than the front seat 330 on the rear side of the front seat 330.

An upper surface of the front seat 330 is a front-side seating surface 330a, on which the occupant R is seated. The seat 313 includes a step portion 332, which vertically connects a rear end portion of the front-side seating surface 330a and a front end portion of the upper surface 331a of the rear seat 331. The step portion 332 is also a front end portion of the rear seat 331. The step portion 332 is formed between the front seat 330 and the rear seat 331.

A front surface 332a of the step portion 332 is inclined rearward with respect to the vertical direction in a vehicle side view, and is disposed to face a front upper side of the motorcycle 301. The front surface 332a is positioned on an upper side relative to the front seat 330. In addition, left and right side surfaces 332b of the step portion 332 are positioned on an upper side relative to the front seat 330.

The passenger is able to sit on an upper surface 331a of the rear seat 331.

Similarly to the above first embodiment, the airbag device 40 is provided in the step portion 332. The airbag 42 is deployed forward of the vehicle from at least one of the front surface 332a or the side surfaces 332b of the step portion 332.

REFERENCE SIGNS LIST 1, 301 Motorcycle (saddle-type vehicle)
40 Airbag device
41 Inflator
42, 242 Airbag
43b Connection portion
45a Airbag-side connection portion
65 Separation mechanism
66 Inlet
67 Valve
68 Lock mechanism portion
70 Hole portion
71 Recess
72 Engagement member
73 Tubular member

The invention claimed is:

1. An airbag device for a saddle vehicle, the airbag device comprising an inflator, and an airbag to be inflated by gas released by the inflator, wherein
after the airbag is inflated and deployed, the airbag is separated from the inflator,
a separation mechanism that connects the inflator and the airbag to be separable from each other is included, and
the separation mechanism is actuated by pressure of the gas in the airbag, and separates the airbag.

2. The airbag device for the saddle vehicle according to claim 1, wherein the airbag is separated while keeping airtightness of the gas in the airbag.

3. The airbag device for the saddle vehicle according to claim 1, wherein
   the separation mechanism includes a valve that closes an inlet of the gas released by the inflator in the airbag, and a lock mechanism portion that locks the airbag in a state of being connected with the inflator, and
   the valve presses the lock mechanism portion with the pressure of the gas in the airbag, releases locking of the lock mechanism portion, and closes the inlet.

4. The airbag device for the saddle vehicle according to claim 3, wherein
   in the separation mechanism, an airbag-side connection portion having a tubular shape of the airbag fits with a connection portion having a tubular shape of the inflator,
   the lock mechanism portion includes an engagement member that passes through a hole portion penetrating the connection portion in a radial direction and that engages with a recess on an inner periphery of the airbag-side connection portion, and a tubular member that is movable in the connection portion in an axial direction of the connection portion and that presses the engagement member against the recess, and
   the valve presses the tubular member in an axial direction to move the tubular member, and releases pressing of the engagement member against the recess.

5. The airbag device for the saddle vehicle according to claim 1, wherein when release of the gas from the inflator causes the pressure of the gas in the airbag to be higher than pressure of the gas on the inflator side, the airbag is separated.

6. The airbag device for the saddle vehicle according to claim 2, wherein
   the separation mechanism includes a valve that closes an inlet of the gas released by the inflator in the airbag, and a lock mechanism portion that locks the airbag in a state of being connected with the inflator, and
   the valve presses the lock mechanism portion with the pressure of the gas in the airbag, releases locking of the lock mechanism portion, and closes the inlet.

7. The airbag device for the saddle vehicle according to claim 6, wherein
   in the separation mechanism, an airbag-side connection portion having a tubular shape of the airbag fits with a connection portion having a tubular shape of the inflator,
   the lock mechanism portion includes an engagement member that passes through a hole portion penetrating the connection portion in a radial direction and that engages with a recess on an inner periphery of the airbag-side connection portion, and a tubular member that is movable in the connection portion in an axial direction of the connection portion and that presses the engagement member against the recess, and
   the valve presses the tubular member in an axial direction to move the tubular member, and releases pressing of the engagement member against the recess.

8. The airbag device for the saddle vehicle according to claim 2, wherein when release of the gas from the inflator causes the pressure of the gas in the airbag to be higher than pressure of the gas on the inflator side, the airbag is separated.

9. The airbag device for the saddle vehicle according to claim 3, wherein when release of the gas from the inflator causes the pressure of the gas in the airbag to be higher than pressure of the gas on the inflator side, the airbag is separated.

10. The airbag device for the saddle vehicle according to claim 4, wherein when release of the gas from the inflator causes the pressure of the gas in the airbag to be higher than pressure of the gas on the inflator side, the airbag is separated.

* * * * *